United States Patent Office 3,260,866
Patented July 12, 1966

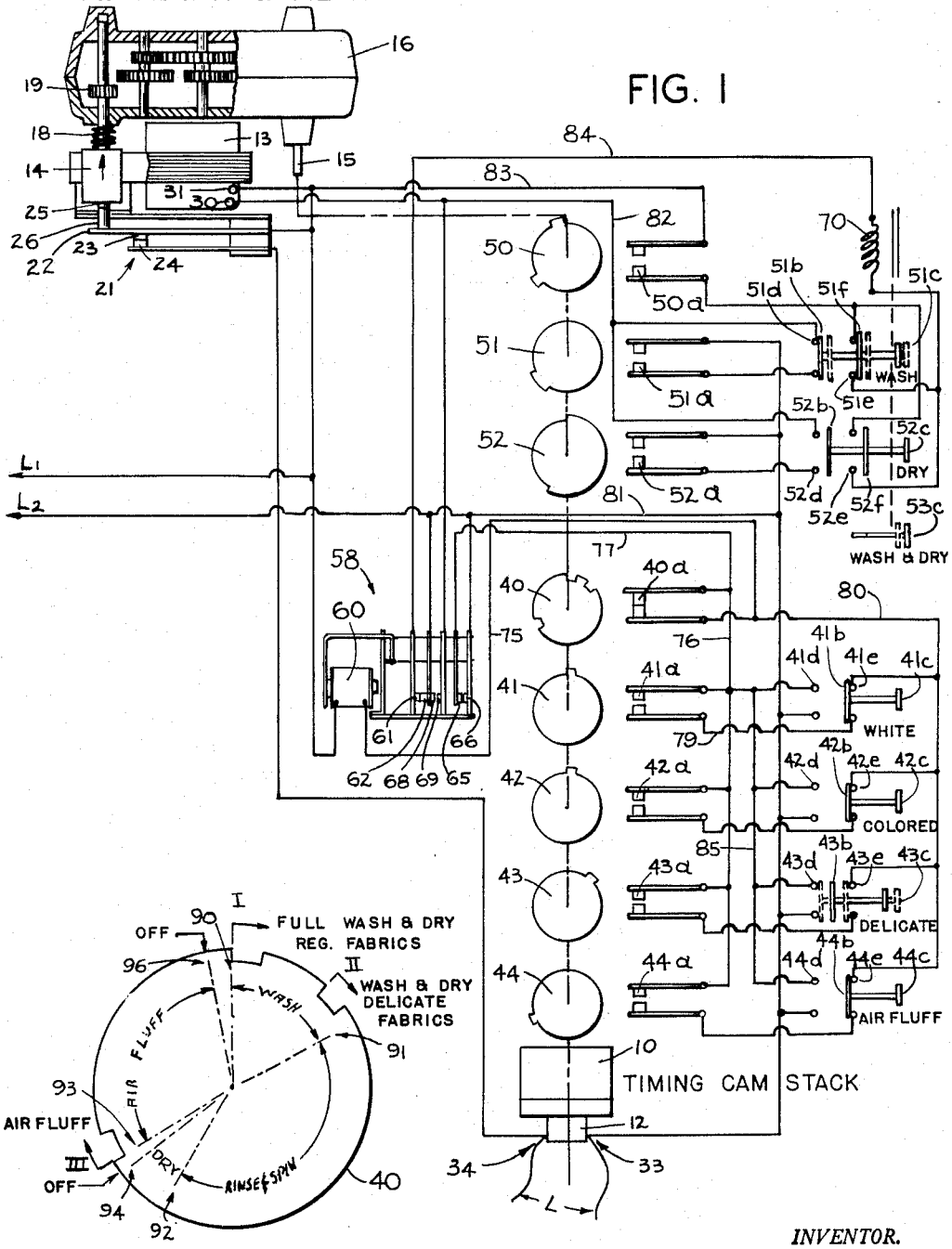

3,260,866
PROGRAM CONTROL FEATURE
Paul A. Martin, Newton, Iowa, assignor to The Maytag Company, Newton, Iowa, a corporation of Delaware
Filed Nov. 6, 1962, Ser. No. 235,743
9 Claims. (Cl. 307—141)

This invention relates to automatic control devices, and more particularly, to a selection system for obtaining a programmed series or cycle of operations and which includes means for optionally modifying the predetermined programmed cycles, such as are employed in washers, driers or combination washer-drier units. This invention represents an improvement to the copending application of John C. Mellinger, Serial No. 98,689, filed March 27, 1961 now Patent No. 3,215,867 and assigned to the assignee of the instant invention.

Present controls for appliances such as washers, driers, and washer-drier units provide for one button selection of various programmed cycles of operation with a resultant simplicity of selection by the operator. These controls, however, do not provide the flexibility of operation afforded with controls which require the manual operation of the timer and various switches to select washing variables such as washing time, and water temperature, for example.

The present invention includes a selection system for obtaining a programmed group of operations by merely pushing a single button, and also includes apparatus for selecting optional modifications to the selected programmed group of operations. Thus the present invention secures advantages of the one button selection system and in addition secures advantages of the manual selection system.

It is thus an object of the present invention to provide a simplified selection system for obtaining a programmed group of operations including means for the optional modification of the selected predetermined series of operations.

It is a further object of the invention to provide a selection system, as for a combination washer-drier unit, for example, in which a portion of the basic programmed cycle, such as the washing operation or the drying operation, may be omitted by actuating a modification system which is automatically deactuated at a predetermined time.

It is still a further object of the invention to provide a selection system in which the basic cycle of operation may be modified by manually actuating an additional selector, with said selector being automatically reset to the unactuated position upon completion of said modified cycle for indicating that the control system is in the condition for operation of a complete unmodified programmed cycle.

Further objects and advantages of this invention will become evident as the description proceeds and from an examination of the accompanying drawing which illustrates one embodiment of the invention and in which similar numerals refer to similar parts throughout the several views.

In the drawings:

FIGURE 1 is a diagrammatic illustration showing the control system of the present invention; and FIGURE 2 is an enlarged view of the master selection cam.

Referring now to FIGURE 1 in the drawing, there is shown diagrammatically a timing cam stack 10 for controlling the cycles of operation in a combination washer-drier unit used for illustrating and disclosing the present invention. By way of explanation, the usual cycle for a combination washer-drier unit includes washing, rinsing, water extraction, and drying operations. The cam stack 10 is normally driven by a timing motor 12 at a slow timing speed to sequentially operate the machine through the usual washing, rinsing, spinning, and drying operations with each of the operations being of a predetermined time duration.

When the cam stack 10 is under control of the rapid advance motor 13, it is advanced at high speeds. Upon energization of the rapid advance motor 13, the shaft 15, to which is connected the cam stack 10, is rotated at high speeds through the advance motor rotor 14 and gear box 16. The speed of the shaft 15 when rotated by the advance motor 13 is fast enough so that lengthy pauses in the cycle of operation do not occur.

The rotor armature 14 of the advance motor is capable of rotary and translatory movement, and is normally biased by coil spring 18 along its longitudinal axis away from gear box 16. When the advance motor is energized, the rotor moves toward the gear box 16 as indicated by the arrow, so that pinion 19 mounted on the rotor shaft engages and drives the gear train to spin shaft 15 at a high speed. However, when the rapid advance motor 13 is de-energized, spring 18 separates the gear 19 from the gear train of gear box 16 and the rotation of shaft 15 is immediately discontinued.

Contact 23 of switch 21 is mounted on a movable spring arm 22 having a pin 26 engaged by pin 25 of the rotor 14. It will be noted that the rotor is biased by spring 18 to normally position contact 23 against contact 24. A circuit may thus be completed between contacts 23 and 24 so as to energize the timer motor 12 and any other electrical load components L connected between terminals 33 and 34 on the timer motor. When the advance motor is energized, rotor 14 moves toward the gear box to disengage contact 23 from contact 24 to deenergize the timer motor 12 and other load components L.

The automatic control shown in FIGURE 1 includes a rapid advance system for selection of a programmed cycle of operation and an optional cycle modification system. The selection system includes timer cams 40 through 44 and their related contacts, switches, and push buttons such as 41a through 41e and the cycle modification system includes cams 50 through 52 and the related contacts, switches and push buttons such as 50a through 50f and which will be more fully described hereinafter. Generally speaking, the advance system moves the cam stack 10 by operation of the rapid advance motor to the start point of any one of several selectable programmed cycles of operation. The cycle modification system, when manually energized by depressing the button indicating the desired change, rapidly advances the cam stack through a preselected portion of the previously selected programmed cycle of operations by operation of the rapid advance motor so as to achieve the desired modification of that cycle of programmed operation.

The advance system will now be described in detail. Timer cams 40 through 44 and push buttons 41c through 44c with their associated timer switches 40a through 44a, push button switches 41b through 44b, and push button switch contacts 41d through 44d and 41e through 44e are used to control the energization of relay 58 which in turn controls the energization of advance motor 13. The cams of the advance system, and the respective switches which they control, may be divided into two groups. In the first group is the master cam 40 and the switch 40a controlled by it. The second group includes slave cams 41 through 44 and their respective slave switches 41a to 44a. The slave group may include a greater or lesser number, depending upon the desired number of selection positions in the combination washer-drier unit. In order to illustrate the present invention, three start positions I, II and III are employed. Push button switches 41c to 44c, which carry a legend of a particular selectable cycle, are used to register selection of the desired cycle and thus the proper start position.

As shown in the drawing, master cam switch 40a is normally closed except for a small increment of time at the beginning of each selectable cycle. Slave cam switches 41a through 44a are normally open, except the cam switch related to the selected cycle is closed for a small increment of time at the beginning of the desired cycle corresponding to the increment during which the master cam switch 40a is open. Thus it is seen that at least one of the timer switches 40a through 44a is closed at all times. It will be noted that the cam switches are closed by the rise on their controlling cam.

It is seen in FIGURE 1 that the timer cam switches 41a through 44a and the contacts and switches related to each of push buttons 41c through 44c are similarly constructed and arranged and are connected in a parallel circuit, thus an explanation of the operation and function of one cam switch and the related push-button switch will sufficiently describe the operation of the selection system.

Referring to push button 43c, which is illustrated in the depressed condition, there is shown in dotted lines alternate positions of push-button switch 43b. The operation of this push button and its related push-button switch and timer cam switch will be described for purposes of explaining the operation of the selection system. Push-button switch 43b is normally biased to a position by a spring (not shown) to close contacts 43e. When the push button is depressed by the operator to select the desired cycle of operation, it travels to an innermost position to close contacts 43d for a brief period of time. As the push button is released by the operator, the switch is partially returned and then latched to maintain it in a position as illustrated by the full line position of switch 43b in FIGURE 1 of the drawing, so that both contacts 43d and 43e are open.

The momentary closing of contacts 43d energizes relay coil 60 by a circuit from power line $L_2$ through line 81 and the closed contacts 43d, line 85, line 76, master cam switch 40a, and line 75, to one side of the relay coil 60. The other side of relay coil 60 is connected directly to power line $L_1$. If at the momentary closing of contacts 43d the master cam switch 40a is open, the energization of advance motor 13 is completed through a parallel circuit which includes the particular slave cam switch that is closed and the corresponding pre-selection push-button switch. If, for example, master cam switch 40a is open and cam switch 41a is closed, the circuit would be as follows: power line $L_2$ through line 81 and the momentarily closed contacts 43d, line 85, cam switch 41a, line 79, push-button switch 41b across contacts 41e, line 80, and line 75 to relay coil 60. Energization of relay coil 60 in turn energizes advance motor 13 through relay contacts 68 and 69 through a circuit which will be explained hereinafter.

After the relay coil 60 is energized by the momentary completion of a circuit through contacts 43d, relay switch contacts 65, 66 are closed to complete a holding circuit to maintain the relay coil energized. The holding circuit may be completed through contacts 65, 66 and through either the timer cam switch 40a or any one of the slave cam switches 41a through 44a and the related push-button switch. If timer cam switch 40a is closed, the circuit is from $L_2$, through contacts 66, 65, line 77, timer cam switch 40a, and line 75 to relay coil 60. If, however, cam switch 40a is open, as it is at the start points I, II and III, and cam switch 41a is closed as at I or II, the circuit will be from power line $L_2$, through contacts 66 and 65, line 77, line 76, timer switch 41a, line 79, push-button switch 41b made across contacts 41e, line 80, and line 75 to relay coil 60.

When relay coil 60 is energized, contacts 68, 69 are closed to energize the advance motor through a circuit from $L_2$, through contacts 68, 69, and line 86 to terminal 30 of advance motor 13. The other side of the advance motor is connected at contact 31 to power line $L_1$. The result is that the advance motor is operated as long as the relay coil is energized by the holding circuit described hereinabove.

Relay coil 60 will remain energized until rotation of timer cam stack 10 allows master cam switch 40a to open at a location corresponding to the start point of the selected cycle as indicated by an open push-button switch across one of contacts 41e through 44e. In the present explanation, master cam switch 40a will open as cam switch 43a closes. In addition, push-button switch 43b is open across contacts 43a since push button 43c is depressed. Thus relay coil 60 is deenergized, the operation of the advance motor is stopped, and the timer motor is energized to advance the cam stack at normal slow speeds through the subsequent sequential positions.

Referring now to FIGURE 2 of the drawing which illustrates the master cam 40, it will be noted that the cam may be divided into sections corresponding to the various operations performed by a combination washer-drier unit in a complete cycle, since the advance cams, including cam 40, are mounted on shaft 15 which is connected to the timing cam stack 10. The start point of the various operations is indicated by the dot and dash lines of 90, 91, 92 and 93. For example, the first part of the washing operation begins with the fill and tumble period as indicated by line 90 which may continue to the dot and dash line 91. This is followed by a rinse and spin period starting at line 91, and a final dry period starting at line 92. Provision is also made for a separate auxiliary operation such as "air fluff" as indicated starting at line 93.

In the circuit discussed hereinabove, depressing a push button such as push button 43c, allows push-button switch 43b to momentarily make across contacts 43d which thus energizes the rapid advance motor 13 under the control of the selection cams and automatically advances the cam stacks to the start point of the desired cycle, which in this example is starting point II. The master cam 40 has a recessed portion for opening the master cam switch for a short interval of time at the beginning of each selectable cycle, as indicated at positions I, II and III in FIGURE 2. It will be noted that the switching occurring at position II, which is the start point for the cycle desired when push button 43c is depressed, will start the shortened washing operation and will allow the washing operation to continue to dot and dash line 91 and then proceed through a normal full rinse and spin operation and a normal full drying operation.

If in the above example the programming washer-drier did not include the advantages of an optional cycle modification system and the operator had desired to only wash but not dry the fabrics on the selected cycle, it would have been necessary to remain at the washer-drier until the wash and rinsing operation had been completed to manually deenergize the combination washer-drier unit. Thus, in order to provide in a programming-type appliance the flexibility necessary to achieve a cycle of operation including only a portion of the normal programmed cycle, a cycle modification system is provided which allows the operator to optionally modify the basic programmed cycles. This modification system includes a readvance system including manually depressable switches for selecting the desired modification and also includes means for automatically resetting the system to a normal programmed cycle position following completion of the modified cycle.

The readvance portion of the cycle modification system will now be described in detail. The readvance system includes cams 51 and 52 which are secured to shaft 15 which is connected to timer cam stack 10, manually presettable push buttons 51c and 52c which are connected to switches 51b and 52b, and contacts 51d and 52d. A rise on cam 51 or cam 52 closes the respective cam switch 51a or 52a during the portion of the cycle controlled by the timing cam stack 10 which is desired to be omitted or skipped. If, for example, it is desired that only a washing operation be performed, push button 51c may be manually depressed. Since push button 51c closes push-button switch 51b across contacts 51d which are in series with cam switch 51a between power line $L_2$ and terminal 30 of the rapid advance motor 13, rapid advance motor 13 will be energized when timer cam switch 51a is closed by the rise on cam 51, which corresponds to the portion of the cam profile for the drying operation as indicated between dot and dash lines 92 and 94. The circuit for energizing the advance motor through the readvance system is as follows: line $L_2$, line 81, timer cam switch 51a, for example, across push-button switch contacts 51d through push-button switch 51b, and line 82 to terminal 30 of advance motor 13. The other side of advance motor 13 is connected directly to line $L_1$.

It is obvious that a number of readvance cams similar to cams 51 and 52 may be employed to modify or skip one of the operations or a plurality of the operations. In this way, the readvance system may be used to provide the desired flexibility in modifying the preselectable programmed cycles.

It is thus clearly seen that the readvance system is effective for providing flexibility in selecting various cycles of operation which vary from the standard programmed cycles. In the example used in the above explanations in which the "Delicate" fabrics button 43c and the "Wash" button 51c are both depressed, a modified cycle of operation is achieved. The selection of the "Delicate" cycle advances the timer cam stack to position II which is indicated in FIGURE 2 as the start point for a wash and dry cycle for delicate fabrics. The timer will advance the cams slowly under the control of the timer motor 12 to perform a shortened wash operation terminating at dot and dash line 91 and a normal full rinse and spin operation terminating at dot and dash line 92. If a normal wash and dry cycle were being performed, the unit would then continue into the drying portion of the cycle which is started at dot and dash line 92. However, since push button 51c, indicating wash only, is depressed and push-button switch 51d thus closed, rapid advance motor 13 will be energized during the period of the rise on cam 51 to advance cam stack 10 through the normal drying operation to the dot and dash line 94 at which time the combination washer-drier unit will be deenergized.

A more complete and detailed description of the above selection and readvance system is contained in the aforementioned Mellinger application, Serial No. 98,689.

Also forming an important part of the optional modification system is a means for cancelling or resetting the system including optional push buttons such as 51c and 52c to their normal position and depressing push button 53c, which indicates a complete wash and dry cycle, to its normal depressed position. Push button 53c serves only as an indicator and thus does not operate any electrical switches or effect the electrical circuit in any way. This push button carries the legend "Wash & Dry" and thus when in its normal depressed condition indicates that the control system is in condition for a complete, unmodified, programmed cycle of operation. Upon actuation of push buttons 51c or 52c, indicator push button 53c is cancelled or released from the depressed condition.

The means for resetting the cycle modification system includes cam 50, timer cam switch 50a, solenoid 70, push-button switches 51f and 52f, and contacts 51e and 52e. As seen in the drawings, timer cam 50 carries raised portions corresponding to the off portions as shown in FIGURE 2 between dot and dash lines 94 and 93 and between dot and dash lines 96 and 90. Thus as the timer cam stack advances to the off period as at line 94 and 96, timer switch 50a will be closed by cam 50 and a circuit will be completed through push button switches 51f or 52f across contacts 51e or 52e to solenoid 70. Solenoid 70 is mechanically linked to push buttons 51c, 52c and 53c. When energization of solenoid 70, the depressed button 51c or 52c is released and button 53c is depressed. The circuit completed to solenoid 70 is as follows: line $L_1$ to line 83, through timer cam switch 50a, through push-button switch 51f across contacts 51e (when wash only is selected), and to solenoid 70. The other side of solenoid 70 is connected to line $L_2$ through line 84, and relay contacts 61, 62. Since solenoid 70 is energized in a circuit including relay contacts 61 and 62, which are closed only when the relay is deenergized, it is seen that the solenoid will not reset the cycle modification system during selection operations when the relay is energized to allow the rapid advance motor to advance the cam stack to a selected start position. Thus it is seen that the optionally selected button will remain depressed until manually cancelled or until automatically reset at the conclusion of the modified cycle of operation.

By way of summary, the operation of this combination washer-drier unit through a delicate wash only cycle, for example, will be reviewed. To select the desired cycle, the operator must only depress the "Delicate" button 43c and the "Wash" button 51c. After push-button switch 43c is depressed, advance motor 13 will be energized to rapidly rotate the selector cams 40 through 44 until the interval at which master cam switch 40a is open and slave cam switch 43a is closed by their respective cams. At this point, the advance motor will be stopped, since holding circuit for relay coil 60 cannot be completed through the slave circuit which has in series open push-button switch 43b across contacts 43e.

Upon deenergization of advance motor 13, timer motor 12 will be energized for advancing the timing cam stack at the slow timing speed. Timing cam stack 10 will then control the operation of the combination washer-drier unit through a shortened washing operation, and a regular rinse and spin operation. At the completion of the rinse and spin operation, rapid advance motor 13 will be reenergized through timer cam switch 51a to rapidly advance timing cam stack 10 through the normal drying operation to the "off" condition at dot and dash line 94 as seen in FIGURE 2. At this point, solenoid 70 will be energized through timer cam switch 50a to cancel the cycle modification as evidenced by the release of button 51c to its normal "out" position and the depressing of push-button 53c to its normal depressed position.

The advantages of this cycle modification system are evident. It provides, in conjunction with a system for selecting a programmed group of operations, means for providing flexibility in revising or modifying the programmed cycles. It is also seen that this system provides the advantages of the simplified program control system in addition to the flexibility provided by the manual control system. In addition, the system offers the advantage of automatically returning the optional cycle modification system including the push buttons and switches to the normal unactuated condition so that a shortened or modified cycle will not inadvertently be obtained on the succeeding cycle.

In the drawing and specification, there has been set forth a preferred embodiment of the invention and, although specific terms are employed, these are used in a generic and descriptive sense only and not for purposes of limitation. Changes in form and the proportion of parts, as well as the substitution of equivalents, are contemplated as circumstances may suggest or render expedient without departing from the spirit or scope of this invention as further defined in the following claims.

I claim:

1. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period for locating said timing means at the desired position in said series of operations, said selection means being responsive to manual initiation; modification means including second circuit means and actuatable from a first condition to a second condition for energizing said rapid advance means through said second circuit means to optionally omit at least one portion of said series of operations; and means for returning said modification means to said first condition from said second condition after said portion is omitted from said series of operations.

2. In an automatic control system, the combination comprising: timing means for controlling a series of operations; timer motor means for driving said timing means at a normal slow speed; rapid advance means for driving said timing means at a high speed; cycle selection means operable from a first posture to a second posture for the selection of a cycle of operations from said series of operations including first circuit means for energizing said rapid advance means for a short period and then initiating said timing means at the selected start point at said normal speed in said series of operations and modification means having second circuit means for energizing said rapid advance means to omit a selected portion of said series of operations; and means for returning said cycle selection means to said first posture after said portion is omitted from said series of operations.

3. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period for locating said timing means at the selected position in said series of operations, said selection means being responsive to manual initiation; modification means including second circuit means and actuatable for energizing said rapid advance means through said second circuit means to omit a portion of said series of operations; and means to return said modification means to the unactuated condition after said portion is omitted from said series of operations.

4. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period for locating said timing means at the desired start position in said series of operations, said selection means being responsive to manual initiation; optional modification means including second circuit means and actuatable from a first condition to a second condition for energizing said rapid advance means through said second circuit means to skip at least one portion of said series of operations; and means for returning said modification means to said first condition from said second condition after said portion is skipped.

5. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period for locating said timing means at the desired start position in said series of operations, said selection means being responsive to manual initiation; modification means including second circuit means and actuatable from a first condition to a second condition for energizing said rapid advance means through said second circuit means to optionally omit at least one portion of said series of operations; solenoid means for returning said modification means to said first condition from said second condition; and third circuit means for energizing said solenoid means after said portion is omitted.

6. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period and to initiate operation of said timing means at the selected start position in said series of operations, said selection means being responsive to manual initiation; modification means including second circuit means and actuatable from a first condition to a second condition for energizing said rapid advance means through said second circuit means to optionally omit at least one portion of said series of operations; solenoid means for returning said modification means to said first condition from said second condition; and third circuit means including switch means responsive to actuation of said modification means to said second condition for energizing said solenoid means after said portion is omitted.

7. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period and to initiate operation of said timing means at the selected start position in said series of operations, said selection means being responsive to manual initiation; optional modification means including second circuit means and actuatable for energizing said rapid advance means through said second circuit means to modify said cycle of operation by omitting at least one portion of said series of operations; solenoid means for returning said modification means to an unactuated condition; and third circuit means including first switch means actuatable to a closed position in response to actuation of said modification means, second switch means actuatable to an open position during periods of operation of said rapid advance means and third switch means actuatable to the closed position in response to termination of said series of operations, said third circuit means being operable for energizing said solenoid means through said first, second, and third switch means whereby said cycle modification means is returned to said unactuated condition only at completion of the modified series of operations and not during periods of rapid advance of said timing means.

8. In an automatic control system, the combination comprising: timing means for controlling a series of operations; timer motor means for driving said timing means at normal slow speeds; rapid advance means for driving said timing means at high speeds; selection means for choosing said series of operations; first circuit means under the control of said selection means to initiate operation of said rapid advance means for a short period and to initiate said timing means at the selected start position in said series of operations, said selection means being responsive to manual initiation; modification means including second circuit means and actuatable from a first condition to a second condition for energizing said rapid advance means through said second circuit means to optionally omit at least one portion of said series of operations; indicator means for indicating said automatic control system is in condition for full cycle operation, said indicator means being cancelled upon actuation of said modification means from said first condition to said second condition; and means for returning said modification means to said first condition from said second condition after said portion is omitted from said series of operations.

9. In an automatic control system, the combination comprising: timing means for controlling a series of operations; timer motor means for driving said timing means at a normal slow speed; rapid advance means for driving said timing means at a high speed; cycle selection means operable from a first posture to a second posture for the selection of a cycle of operations from said series of operations including first circuit means for energizing said rapid advance means for a short period and then initiating said timing means at the selected start point in said series of operations and modification means having second circuit means for energizing said rapid advance means to omit a selected portion of said series of operations; indicator means for indicating that said automatic control system is in condition for full cycle operation, said indicator means being cancelled upon actuation of said cycle selection means from said first posture to said second posture; solenoid means for returning said cycle selection means to said first posture from said second posture and for reactuating said indicator means; and third circuit means for energizing said solenoid means subsequent to operation of said rapid advance means through said selected portion of said series of operations.

References Cited by the Examiner

UNITED STATES PATENTS 2,391,718  12/1945  Lindemann _____ 307—141.4

ORIS L. RADER, *Primary Examiner.*

LLOYD McCOLLUM, *Examiner.*

W. SHOOP, *Assistant Examiner.*